United States Patent
Kwon (12)
(10) Patent No.: US 6,337,545 B1
(45) Date of Patent: Jan. 8, 2002

(54) APPARATUS AND METHOD FOR GENERATING VOLTAGE FOR DRIVING CATHRODE RAY TUBE

(75) Inventor: Hyeok-chul Kwon, Incheon (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/491,383

(22) Filed: Jan. 26, 2000

(30) Foreign Application Priority Data

Feb. 10, 1999 (KR) .............................................. 99-4682
Oct. 5, 1999 (KR) .............................................. 99-42875

(51) Int. Cl.[7] .................................................. G09G 1/04
(52) U.S. Cl. ...................................... 315/408; 315/387
(58) Field of Search ................................ 315/364, 366, 315/387, 388, 408, 411

(56) References Cited

U.S. PATENT DOCUMENTS

| | | | | |
|---|---|---|---|---|
| 4,010,401 A | * | 3/1977 | Yasumatsuya et al. | 315/379 |
| 4,302,708 A | * | 11/1981 | Spilsbury | 315/389 |
| 5,561,354 A | * | 10/1996 | Simons et al. | 315/408 |
| 5,717,296 A | * | 2/1998 | Onozawa et al. | 315/371 |
| 6,005,634 A | * | 12/1999 | Lam et al. | 348/541 |

* cited by examiner

Primary Examiner—Tho Phan
Assistant Examiner—Shih-Chao Chen
(74) Attorney, Agent, or Firm—Mills & Onello, LLP

(57) ABSTRACT

A CRT driving voltage generating apparatus which can be realized and integrated at low cost, and can prevent breakdown and malfunction of circuits by actively adapting to a change in the frequency of a horizontal synchronous signal, and a CRT driving voltage generating method performed by the apparatus are provided. In this apparatus, a first comparator compares a reference value with the peak value of a fly back pulse. A stability controller shifts the level of the result of the comparison using a current mirroring technique and outputs a compared signal having a shifted level. A second comparator compares the compared signal with a sensing signal to obtain a reset signal. A pulse width modulated signal generator outputs a pulse width modulated signal having a level which is determined in response to the logic levels of a clock signal and a reset signal. A driving voltage generator generates the CRT driving voltage in response to the pulse width modulated signal. A voltage sensor senses the level of the CRT driving voltage to generate the sensing signal. A horizontal output unit generates the fly back pulse having an amplitude which is determined in response to the frequency of a horizontal output signal and the level of the CRT driving voltage.

10 Claims, 6 Drawing Sheets

APPARATUS AND METHOD FOR GENERATING VOLTAGE FOR DRIVING CATHRODE RAY TUBE

BACKGROUND OF THE INVENTION

1. Field of the Invention

The present invention relates to a system which uses a cathode ray tube (CRT), and more particularly, to an apparatus and method for generating a voltage required for driving a CRT.

2. Description of the Related Art

In general, an apparatus for generating a voltage for driving a CRT provides a soft start function to prevent the circuits in the CRT from being damaged when a CRT driving voltage which drives a deflection yoke that generates horizontal deflection current in the CRT is abruptly applied.

When a conventional CRT driving voltage generating apparatus is integrated, most of the devices used for performing the soft start function must be separately installed on the outside of an integrated circuit. To overcome this problem, in one conventional CRT driving voltage generating apparatus, devices for performing the soft start function are realized by a high-cost bipolar process. As a result, this conventional CRT driving voltage generating apparatus can be integrated with the soft start devices for performing the soft start function. However, this conventional apparatus is high in cost.

Also, in the conventional CRT driving voltage generating apparatus, when the frequency of a horizontal synchronization signal is abruptly changed from a high frequency to a low frequency, a horizontal deflection system circuit may be damaged, or may not operate normally. This is because a CRT driving voltage is maintained at a higher level than required until the CRT driving voltage generating apparatus generates a stable CRT driving voltage, when the frequency of the horizontal synchronization signal is abruptly changed. This is the reason that the intensity of the CRT driving voltage is greater when the horizontal synchronization signal has a high frequency than when it has a low frequency.

SUMMARY OF THE INVENTION

An object of the present invention is to provide a CRT driving voltage generating apparatus which can be realized and integrated at a low cost, and can prevent breakdown and malfunction of circuits by actively tolerating a change in the frequency of a horizontal synchronization signal.

Another object of the present invention is to provide a CRT driving voltage generating method performed by the CRT driving voltage generating apparatus.

To achieve the first object of the invention, there is provided an apparatus for generating a cathode ray tube (CRT) driving voltage for driving a deflection yoke for generating a horizontal deflection current in a CRT. The apparatus includes a first comparator for comparing a reference value with the peak value of a fly back pulse. A stability controller shifts the level of the result of the comparison using a current mirroring technique and outputs a compared signal having a shifted level. A second comparator compares the compared signal with a sensing signal to obtain a reset signal. A pulse width modulated signal generator outputs a pulse width modulated signal having a level which is determined in response to the logic level of the reset signal and the logic level of a clock signal locked to a horizontal synchronous signal. A driving voltage generator generates the CRT driving voltage in response to the pulse width modulated signal. A voltage sensor senses the level of the CRT driving voltage to generate the sensing signal. A horizontal output unit generates the fly back pulse having an amplitude which is determined in response to (i) the frequency of a horizontal output signal when the horizontal output signal is locked to the horizontal synchronous signal, and (ii) the level of the CRT driving voltage.

In one embodiment, the apparatus of the invention also includes a frequency sensor for sensing the variation of the frequency of the horizontal synchronous signal and outputting a control signal in response to the sensed variation. The stability controller shifts the level of the result of the comparison in the first comparator in response to the control signal and outputs the compared signal having a shifted level. In one embodiment, the frequency sensor includes a phase locked loop for locking a self-oscillated frequency to the frequency of the horizontal synchronous signal and generating the control signal indicating whether the self-oscillated frequency has been locked to the frequency of the horizontal synchronous signal.

In one embodiment, the first and second comparators, the stability controller, the pulse width modulated signal generator and the voltage sensor are integrated into a single chip. In another particular embodiment, the single chip also includes the frequency sensor.

To achieve the second object of the invention, there is provided a CRT driving voltage generating method. In accordance with the method of the invention, it is continuously determined whether power has been applied to the apparatus for generating a CRT driving voltage. If the power has been applied, the difference between a reference value and the peak value of a fly back pulse is shifted using a current mirroring technique. The CRT driving voltage is generated using a signal having a level which is a shifted difference, wherein the amplitude of the fly back pulse is determined in response to (i) the frequency of a horizontal output signal when it is locked to a horizontal synchronous signal, and (ii) the level of the CRT driving voltage.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF THE PREFERRED EMBODIMENTS

Hereinafter, the present invention will be described in detail by explaining preferred embodiments of the present invention with reference to the attached drawings.

Figure 1:
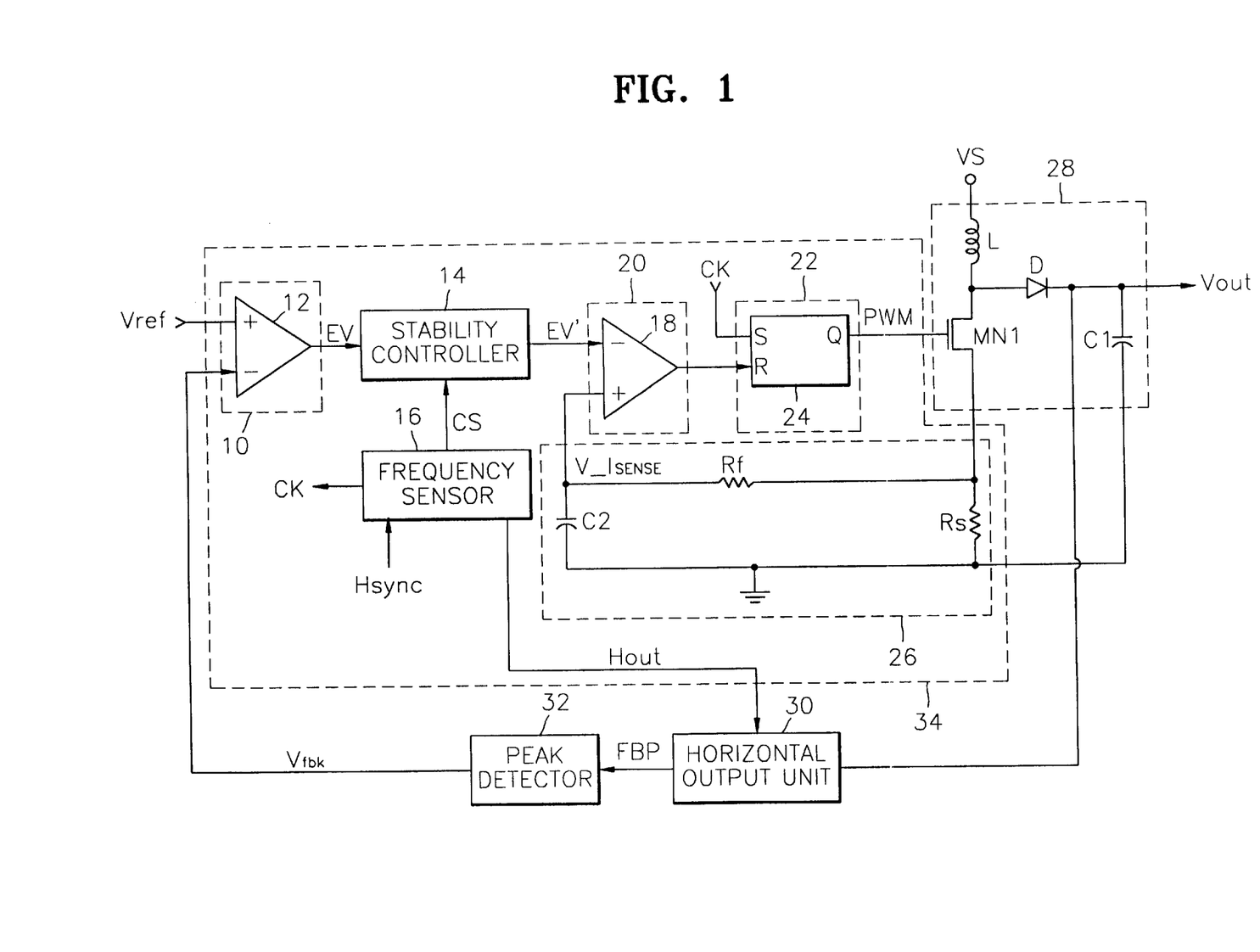
FIG. 1 is a schematic block diagram of one embodiment of an apparatus for generating a voltage for driving a cathode ray tube (CRT), according to the present invention.

Referring to FIG. 1, a CRT driving voltage generating apparatus according to the present invention includes first and second comparators 10 and 20, a stability controller 14, a frequency sensor 16, a pulse width modulated signal generator 22, a driving voltage generator 28, a voltage sensor 26, a horizontal output unit 30, and a peak detector 32.

The first comparator 10 compares a reference value Vref with the peak value Vfbk of a fly back pulse (FBP) and outputs the result of the comparison to the stability controller 14. The first comparator 10 is realized with a comparator 12 for comparing a reference value Vref received via a positive input port (+) with the peak value Vfbk of a FBP received via a negative input port (−) and outputting the result of the comparison to the stability controller 14.

The stability controller 14 shifts the level of an error value EV, which is the result of the comparison made in the first comparator 10, independently of or in response to a control signal CS, using a current mirror technique. The stability controller 14 outputs a compared signal EV' having a shifted level to the second comparator 20.

Figure 2:
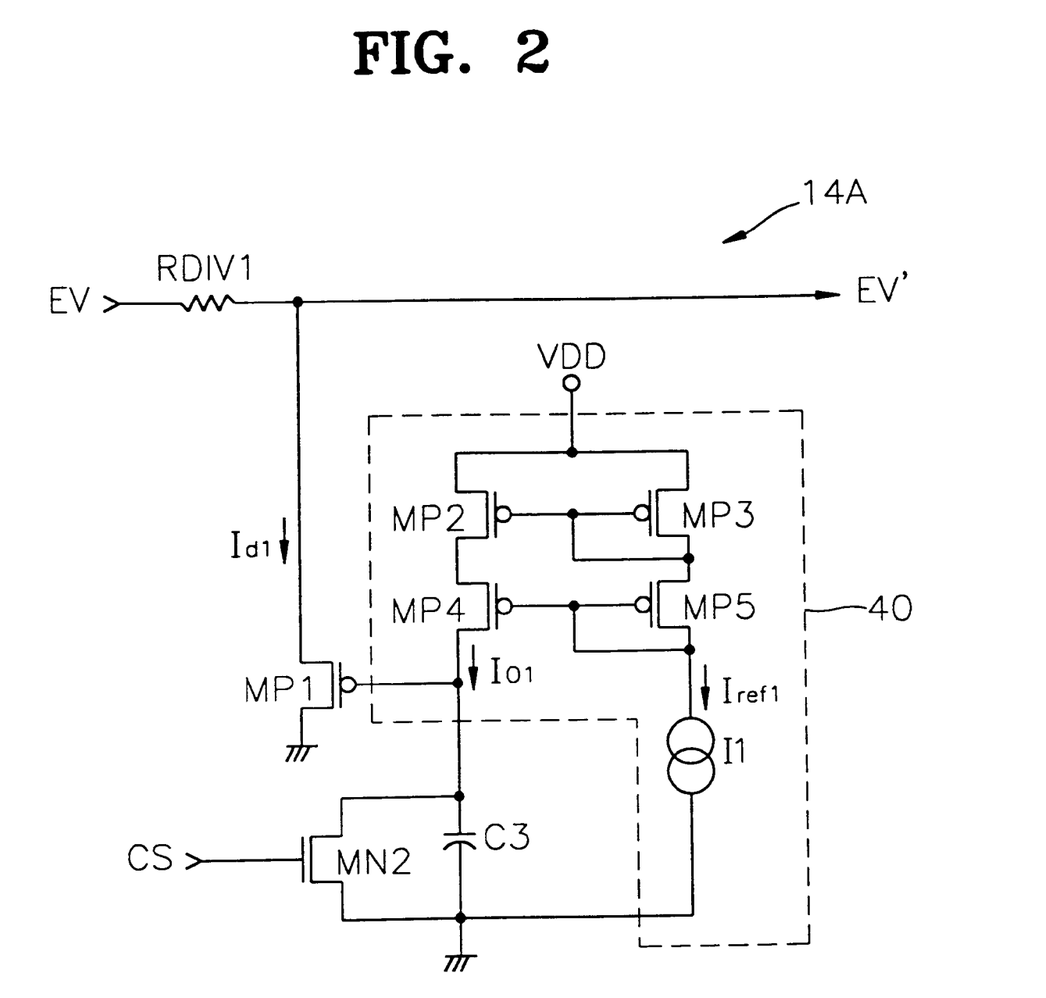
FIG. 2 is a schematic circuit diagram of an embodiment of the stability controller shown in FIG. 1.

FIG. 2 is a circuit diagram of an embodiment of the stability controller 14 shown in FIG. 1. The particular stability controller 14A of FIG. 2 includes a division resistor RDIV1, a PMOS transistor MP1, a MOS current mirror 40, a capacitor C3 and an NMOS transistor MN2.

The stability controller 14A shifts the level of the compared result EV received from the first comparator 10 using the division resistor RDIV1, the PMOS transistor MP1, the capacitor C3, and the MOS current mirror 40, independently of the control signal CS, and outputs the compared signal EV' having a shifted level to the second comparator 20. Here, the current mirror technique denotes a technique in which an output current 1, which is mirrored with respect to a reference current Iref1 by the MOS current mirror 40 including PMOS transistors MP2, MP3, MP4 and MP5 and a current source I1, is applied to the gate of the PMOS transistor MP1. Hence, the capacitor C3 can be charged with a charge corresponding to the output current Io1, and with the lapse of time, a voltage $V_{C3}$ to which the capacitor C3 is charged increases as in the following Equation 1:

$$V_{C3} = (Iref1 \times t)/C3; \quad (1)$$

wherein Iref1 indicates a current which flows in the current source I1, and t indicates time elapsed after power is applied to the apparatus shown in FIG. 1. Thus, the voltage $V_{C3}$ to which the capacitor C3 is charged is applied to the gate of the PMOS transistor MP1 and allows a current Id1 to flow into the drain of the PMOS transistor MP1 as shown in the following Equation 2:

$$Id1 = K(Vgs - Vt)^2; \quad (2)$$

wherein K and Vt are parameters of the PMOS transistor MP1.

Consequently, since the drain current Id1 flows through the division resistor RDIV1, the level of the comparison result EV output by the first comparator 12 can be shifted to a low level, and the compared signal EV', which has a level shifted to a lower level than the level of the comparison result EV and is output to the second comparator 20, is expressed as in the following Equation 3:

$$EV' = EV - Id1 \times RDIV1 \quad (3)$$

Figure 3:
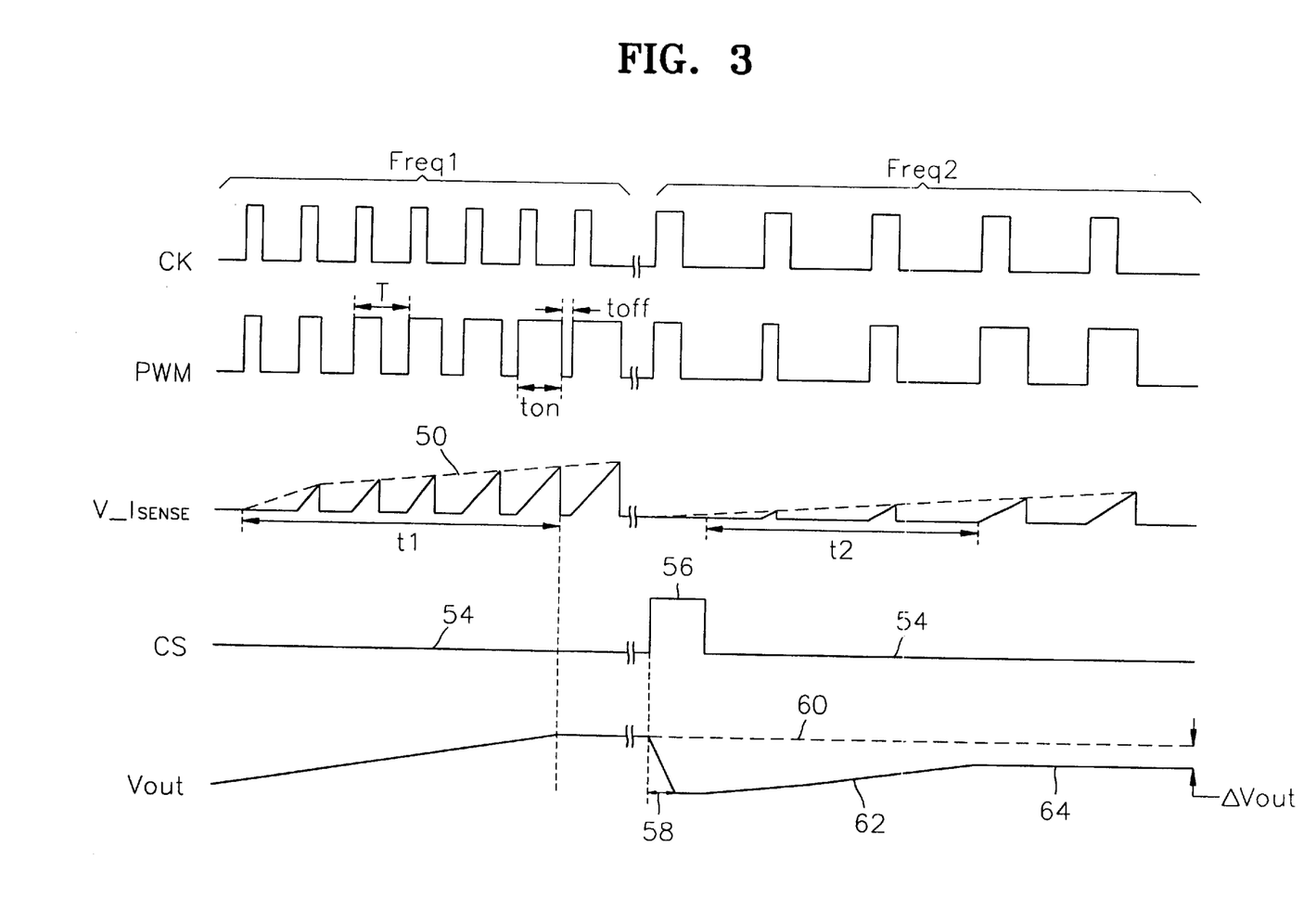
FIG. 3 contains exemplary waveforms for signals referred to in connection with the block diagram of FIG. 1.

FIG. 3 shows diagrams for some of the waveforms in connection with the elements of FIG. 1. Referring again to FIG. 2, the stability controller 14A can further include an NMOS transistor MN2 which is connected to the capacitor C3 in parallel, to divide the level of the comparison result EV in response to the control signal CS shown in FIG. 3. At this time, the frequency sensor 16 shown in FIG. 1 senses the variation of the frequency of a horizontal synchronous signal Hsync, and outputs the control signal CS having a level determined in accordance with the sensed variation, to the stability controller 14. In order to execute this function, the frequency sensor 16 is, for example, realized with a phase-locked loop, and locks the frequency and phase of a horizontal synchronous signal Hsync to the self-oscillated frequency and phase of a self-oscillated signal, and transits a control signal CS to a logic "high" level 56 when not locked and to a logic "low" level 54 when locked. That is, the phase-locked loop operates in a state where it has locked the horizontal synchronous signal Hsync to the self-oscillated signal.

When the frequency of the horizontal synchronous signal Hsync is abruptly changed, the logic high level control signal CS 56 is output to the stability controller 14 until the horizontal synchronous signal Hsync having a sharply-charged frequency is locked to the self-oscillated signal. When the horizontal synchronous signal Hsync having a sharply changed frequency has been locked to the self-oscillated signal, the phase locked loop outputs a logic low level control signal CS 54. Also, the frequency sensor 16 outputs a locked horizontal synchronous signal as a horizontal output signal Hout to the horizontal output unit 30 when the horizontal synchronous signal has been locked to the self-oscillated signal. Also, the frequency sensor 16 delays the horizontal output signal Hout and outputs the delayed signal as a clock signal CK shown in FIG. 3 to the pulse width modulated signal generator 22. Consequently, the NMOS transistor MN2 of the stability controller 14A shown in FIG. 2 is turned on when the logic high level control signal (CS) 56 is received, thus discharging the charge stored in the capacitor C3. Here, as can be seen from Equation 3, the level of the compared signal EV' becomes lower with a decrease in the drain current Id1 of the PMOS transistor MP1. As described above, the stability controller 14 shifts the level of the compared result EV in response to the control signal CS to lower the level of a CRT driving voltage Vout in response to the control signal CS as shown in FIG. 3, when the frequency of the horizontal synchronous signal Hsync is changed from a first frequency Freq1 to a second frequency Freq2, that is, to a low frequency.

The second comparator 20 compares a sensing voltage $V\_I_{SENSE}$ with the compared signal EV' 50, which is output by the stability controller 14 and shown as a dotted line in FIG. 3, at the first frequency Freq1 of the horizontal synchronous signal Hsync. The comparator 20 outputs the result of the comparison as a reset signal to the pulse width modulated signal generator 22. To do this, the second comparator 20 can be realized with a comparator 18 which receives the compared signal EV' 50 and the sensing voltage $V\_I_{SENSE}$ via the negative input port (−) and the positive input port (+), respectively, compares them to each other, and outputs the result of the comparison to the pulse width modulated signal generator 22 via its output port. That is, the comparator 18 outputs a logic low level comparison result as a reset signal to the pulse width modulated signal generator 22 when the level of the compared signal EV' 50 is greater than that of the sensing voltage $V\_I_{SENSE}$. Otherwise, the comparator 18 outputs a logic high level comparison result as a reset signal to the pulse width modulated signal generator 22.

The voltage sensor 26 senses the level of the CRT driving voltage Vout, and outputs the sensing voltage $V\_I_{SENSE}$ which has a sensed level as shown in FIG. 3, to the second comparator 20. To do this, the voltage sensor 26 can include resistors Rf and Rs and a capacitor C2. The voltage sensor 26 having such a configuration integrates a voltage drop across the resistor Rs which is connected to the source of the transistor MN1, and outputs the result of the integration as the sensing voltage V_Isense shown in FIG. 3 to the second comparator 20.

As described above, the pulse width modulated signal generator 22 generates a pulse width modulated signal PWM shown in FIG. 3 having a level which is determined in response to the logic level of the clock signal CK (shown in FIG. 3) output from the frequency sensor 16 and the logic level of the reset signal output from the second comparator 20. The pulse width modulated signal generator 22 outputs the PWM signal to the driving voltage generator 28. To do this, the pulse width modulated signal generator 22 can be realized with an R/S flip flop 24 of a positive edge trigger type. That is, the R/S flip flop 24 is reset in response to a logic high level reset signal received from the comparator 18 of the second comparator 20 via a reset port R to generate a logic low level pulse width modulated signal PWM and output the same via a positive output port Q.

Alternatively, the R/S flip flop 24 determines the level of the pulse width modulated signal PWM in accordance with the logic level of the clock signal CK in response to the low logic level reset signal. That is, when the reset signal is at a logic low level, the logic high level pulse width modulated signal PWM is output to the driving voltage generator 28 via the positive output port Q in response to the logic high level clock signal CK.

The driving voltage generator 28 generates the CRT driving voltage Vout in response to the pulse width modulated signal PWM (shown in FIG. 3) output by the pulse width modulated signal generator 22, and outputs the driving voltage Vout to a deflection yoke for generating a horizontal deflection current in a CRT. The deflection yoke is driven in response to the CRT driving voltage Vout. To do this, the driving voltage generator 28 can be realized with a transistor MN1, an inductor L, a diode D, and a capacitor C1. That is, the driving voltage generator 28 turns on the transistor MN1 in response to the pulse width modulated signal PWM shown in FIG. 3 to generate a driving voltage Vout induced from a coil L, as shown in FIG. 3. The driving voltage Vout is expressed as in the following Equation 4:

$$Vout = Vs \times T/toff;  \qquad (4)$$

wherein T denotes the time between adjacent rising edges of the pulse width modulated signal PWM as shown in FIG. 3, and toff denotes the time during which the pulse width modulated signal PWM remains at a logic low level as shown in FIG. 3.

The horizontal output unit 30 determines the amplitude of the fly back pulse FBP in response to the CRT driving voltage Vout and the horizontal output signal Hout output from the frequency sensor 16.

Figure 4A:
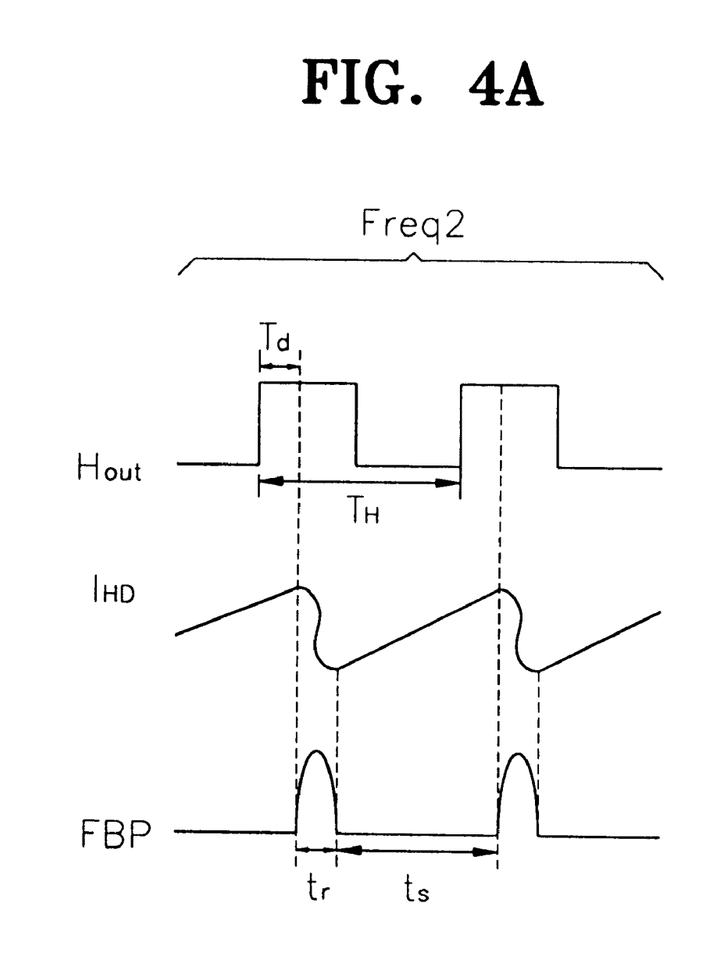
FIGS. 4A and 4B are waveform diagrams illustrating signals in connection with the horizontal output unit shown in FIG. 1.
Figure 4B:
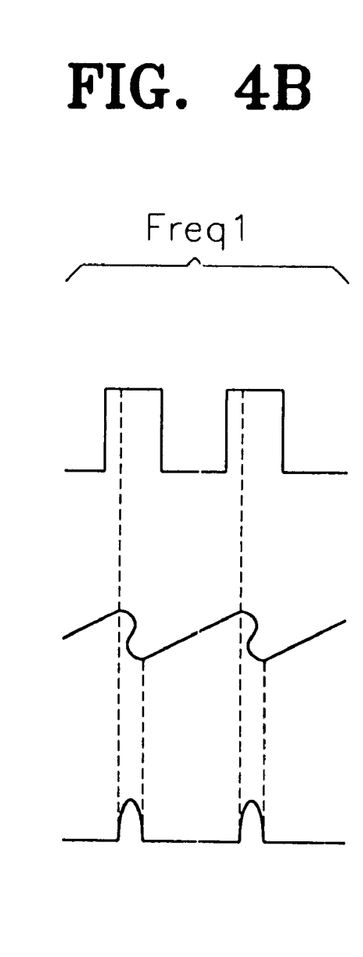

FIGS. 4A and 4B are waveform diagrams used to illustrate the operation of the horizontal output unit 30 shown in FIG. 1. FIG. 4A is a waveform diagram of the case when the frequency of the horizontal synchronous signal Hsync is Freq2, and FIG. 4B is a waveform diagram when the frequency of the horizontal synchronous signal Hsync is Freq1.

The horizontal output unit 30 shown in FIG. 1 is a horizontal deflector (not shown) which is generally used for CRTs, and thus performs the function of the horizontal deflector. Thus, the operation of the horizontal output unit 30 will now be described by taking as an example only the function of generating a fly back pulse FBP, among the functions of the horizontal deflector (not shown).

The horizontal output unit 30 generates a horizontal deflection current $I_{HD}$ and a horizontal fly back pulse FBP in accordance with the frequency (Freq1 or Freq2) of the horizontal output signal Hout output from the frequency sensor 16, after the lapse of a predetermined period of time (td), as shown in FIGS. 4A and 4B. As can be seen from FIGS. 4A and 4B, if the frequency of the horizontal output signal Hout is changed from Freq2 to Freq1, which is greater than Freq2, the amplitudes of the horizontal deflection current $I_{HD}$ and the horizontal fly back pulse FBP are reduced. Consequently, the amplitude Vcp of the fly back pulse FBP is determined by the level of the CRT driving voltage Vout and the period $T_H$ of the horizontal output signal Hout, as shown in the following Equation 5:

$$V_{cp} = V_{out}(1 + \pi t_s t_r / 2); \qquad (5)$$

wherein $t_s$ denotes the time during which the fly back pulse FBP remains at a logic low level, that is, $T_H - t_r$, and $t_r$ denotes the time during which the horizontal deflection current $I_{HD}$ decreases, that is, $\pi\sqrt{LC}$ (where L and C denote the inductance of an inductor (not shown) and the capacitance of a capacitor (not shown) within the horizontal deflector 30, respectively).

The peak detector 32 detects the peak value Vfbk of the fly back pulse FBP output by the horizontal output unit 30, and outputs the detected peak value to the first comparator 10. To do his, the peak detector 32 can be realized with a diode (not shown) having a cathode and an anode which are connected between the fly back pulse FBP and the peak value Vfbk thereof, and a capacitor (not shown) which is connected between the cathode of the diode and a reference voltage.

When the frequency of the horizontal synchronous signal Hsync is lowered from the first frequency Freq1 to the second frequency Freq2, the apparatus shown in FIG. 1 stabilizes and outputs the CRT driving voltage Vout. This will now be described. In this case, the CRT driving voltage (Vout) difference ΔVout between when the horizontal synchronous signal Hsync having the first frequency Freq1 is applied and when the horizontal synchronous signal Hsync having the first frequency Freq2 is applied, is shown in FIG. 3.

In this case, the low level compared signal EV' 50 is output by the stability controller 14 in response to the logic high level control signal CS, and a sensing voltage $V\_I_{SENSE}$ having a level that is greater than the level of a ground which is a reference voltage, is output by the voltage sensor 26. Accordingly, the pulse width modulated signal generator 22 generates a logic low level pulse width modulated signal PWM in response to the logic high level reset signal output by the second comparator 20, as shown in FIG. 3. At this time, an NMOS transistor MN1 in the driving voltage generator 28 is turned off in response to the logic low level pulse width modulated signal PWM. That is, when the frequency of the horizontal synchronous signal Hsync is changed from Freq1 to Freq2, T/toff in Equation 4 greatly decreases, so that the CRT driving voltage Vout is linearly reduced for a predetermined period of time 58 as shown in FIG. 3.

Next, when the logic high level clock signal CK is received, the NMOS transistor MN1 is turned on again in response to the logic high level pulse width modulated signal PWM. In this way, the NMOS transistor MN1 repeatedly turns on and turns off in response to the logic level of the clock signal CK. Accordingly, after the capacitor C3 shown in FIG. 2 is discharged for a predetermined period of time 58, the level of the control signal CS is transited from a logic high level to a logic low level, and the capacitor C3 is then gradually recharged with a charge corresponding to the output current Io1 to thus increase the T/toff of the pulse width modulated signal PWM. A CRT driving voltage 64 remaining stable after a predetermined period of time t2 is eventually output by the driving voltage generator 28.

Consequently, when the frequency of the horizontal synchronous signal Hsync is changed from the first frequency Freq1 to the second frequency Freq2, the conventional CRT driving voltage generating apparatus generates a CRT driving voltage whose level gradually decreases from the logic high level 60 to the stable level 64 over a predetermined period of time t2, so that the circuits in a CRT may be broken down. On the other hand, the CRT driving voltage generating apparatus according to the present invention shown in FIG. 1 generates a CRT driving voltage whose level gradually increases from a logic low level to the stable level 64 over a predetermined period of time t2, thus protecting the circuits in the CRT.

In the aforementioned CRT driving voltage generating apparatus having the stability controller 14A shown in FIG. 2, the time (t1) required to stably generate a CRT driving voltage Vout when power has been initially supplied is the same as the time (t2) required to stably generate the CRT driving voltage Vout when the frequency of the horizontal synchronous signal Hsync has changed from a high frequency to a low frequency, as shown in FIG. 3. However, the time (t2) is required to be shorter than the time (t1). That is, the time (t1) can be long in the initial state of a system to which power is applied, but the time (t2) must not become longer since the frequency of the horizontal synchronous signal changes during the operation of the system and temporarily mutes the horizontal output unit 30. To solve this problem, another embodiment of the stability controller 14 shown in FIG. 1 is provided, and the structure and operation thereof will now be described.

Figure 5:
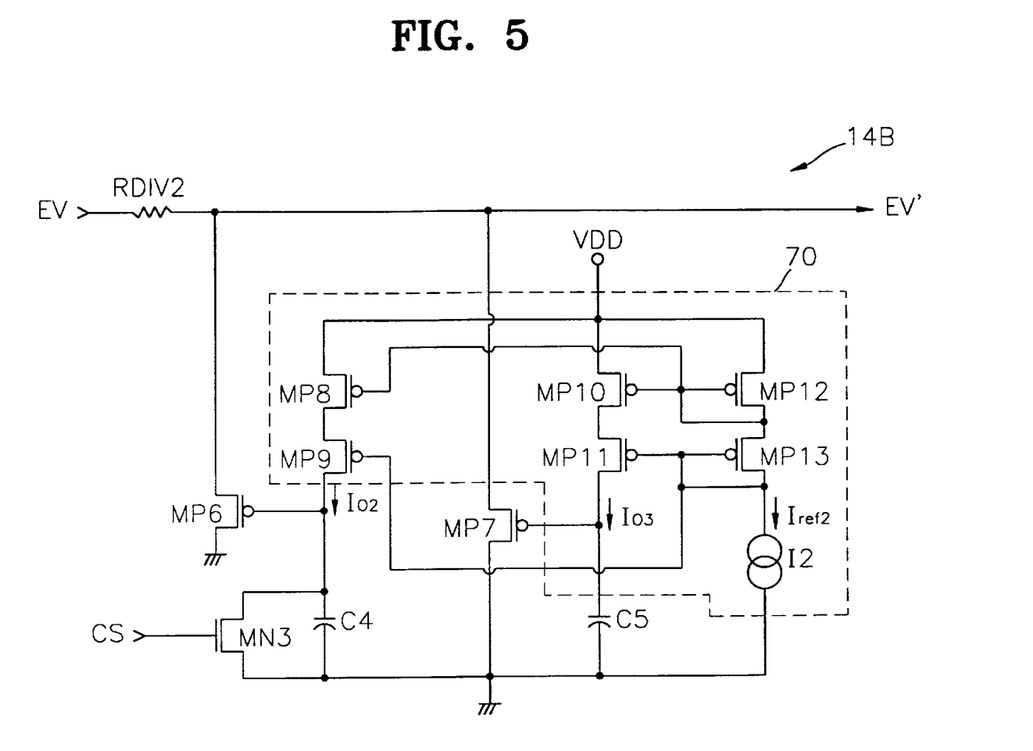
FIG. 5 is a schematic circuit diagram of another embodiment of the stability controller shown in FIG. 1.

FIG. 5 is a circuit diagram of another embodiment of the stability controller 14 shown in FIG. 1. The stability controller 14B shown in FIG. 5 includes a division resistor RDIV2, PMOS transistors MP6 and MP7, a MOS current mirror 70, capacitors C4 and C5, and an NMOS transistor MN3.

The structure and operation of a stability controller 14B shown in FIG. 5 are the same as the structure and operation of the stability controller 14A shown in FIG. 2, except that the stability controller 14B further includes a capacitor C5 and PMOS transistors MP7, MP10 and MP11. Thus, the operation of the stability controller 14B shown in FIG. 5 will now be described, only for the case where the frequency of the horizontal synchronous signal Hsync has varied.

The stability controller 14B shown in FIG. 5 shifts the level of the comparison result EV received from the first comparator 10 independently of the control signal CS using a current mirroring technique and the division resistor RDIV2, the PMOS transistors MP6 and MP7, the capacitors C4 and C5, and the MOS current mirror 70, and outputs a compared signal EV' having a shifted level to the second comparator 20. Here, the current mirroring technique denotes a technique in which output currents Io2 and Io3, mirrored with respect to a reference current Iref2 by the MOS current mirror 70 including PMOS transistors MP8, MP9, MP10, MP11, MP12, and MP13, and a current source I2, are applied to the gate of the PMOS transistor MP6 and the gate of the PMOS transistor MP7, respectively. That is, the capacitors C4 and C5 are charged with charges corresponding to the output currents Io2 and Io3, respectively, for the time (t1) shown in FIG. 3. With the lapse of time, voltages $V_{C4}$ and $V_{C5}$ to which the capacitors C4 and C5 are charged increase as shown in the following Equation 6:

$$V_{C4}=(Iref2 \times t)/C4;$$

$$V_{C5}=(Iref2 \times t)/C5; \quad (6)$$

wherein Iref2 denotes a current which flows in the current source I2, and t denotes the time elapsed after power is applied to the apparatus shown in FIG. 1.

Thus, the voltages $V_{C4}$ and $V_{C5}$ to which the capacitors C4 and C5 are charged are applied to the gate of the PMOS transistor MP6 and the gate of the PMOS transistor MP7, respectively. This causes currents Id6 and Id7, expressed as in the following Equation 7, to flow to the drain of the PMOS transistor MP6 and the drain of the PMOS transistor MP7, respectively:

$$Id6=K'(Vgs-Vt')^2;$$

$$Id7=K''(Vgs-Vt'')^2; \quad (7)$$

wherein K' and Vt' denote parameters of the PMOS transistor MP6, and K'' and Vt'' denote parameters of the PMOS transistor MP7.

Thus, since the currents Id6 and Id7 flow into the division resistor RDIV2, the compared signal EV' having a level shifted to be lower than the level of the comparison result EV output by the first comparator 12 is expressed by the following Equation 8:

$$EV'=EV-(Id6+Id7) \times RDIV2 \quad (8)$$

Similar to the stability controller 14A shown in FIG. 2, the stability controller 14B shown in FIG. 5 can further include an NMOS transistor MN3 connected to the capacitor C4 in parallel to divide the level of the comparison result EV in response to the control signal CS shown in FIG. 3. If the frequency of the horizontal synchronous signal Hsync varies, and thus a logic high level control signal (CS) 56 is received by the gate of the NMOS transistor MN3 in the stability controller 14B, a charge stored in the capacitor C4 is discharged via the turned-on NMOS transistor MN3 for a predetermined period of time 58, and a charge stored in the capacitor C5 is held. As can be seen from Equation 7, the drain current Id6 in the PMOS transistor MP6 decreases due to this discharge, so that the level of the compared signal EV' is lowered.

At this time, the charge in the capacitor C4 is completely discharged for a predetermined period of time 58, and the capacitor C4 is then re-charged for a predetermined period of time t2 by MOS current mirror 70 after the level of the control signal CS is transited from a logic high level to a logic low level. Finally, the CRT driving voltage Vout gradually increases for the predetermined period of time t2 as shown in FIG. 3, thus becoming a stabilized CRT driving voltage Vout 64.

Here, when the capacitance of the capacitor C5 is greater than that of the capacitor C4, the time t1 is longer than the time t2 since both the capacitors C4 and C5 must be charged during the time t1 and only the capacitor C4 must be charged during the time t2. Hence, the time t2 required to generate a stable CRT driving voltage Vout when the frequency of the horizontal synchronous signal Hsync has been sharply changed is shorter than the time t1 required for the CRT driving voltage Vout to be stably generated in the initial state of a system when power is applied.

The first and second comparators 10 and 20, the stability controller 14, the frequency sensor 16, the pulse width modulated signal generator 22, and the voltage sensor 26 can be integrated into a single chip 34 as shown in FIG. 1.

A CRT driving voltage generating method according to the present invention, which can be performed, for example, by the apparatus shown in FIG. 1, will now be described with reference to FIG. 6.

Figure 6:
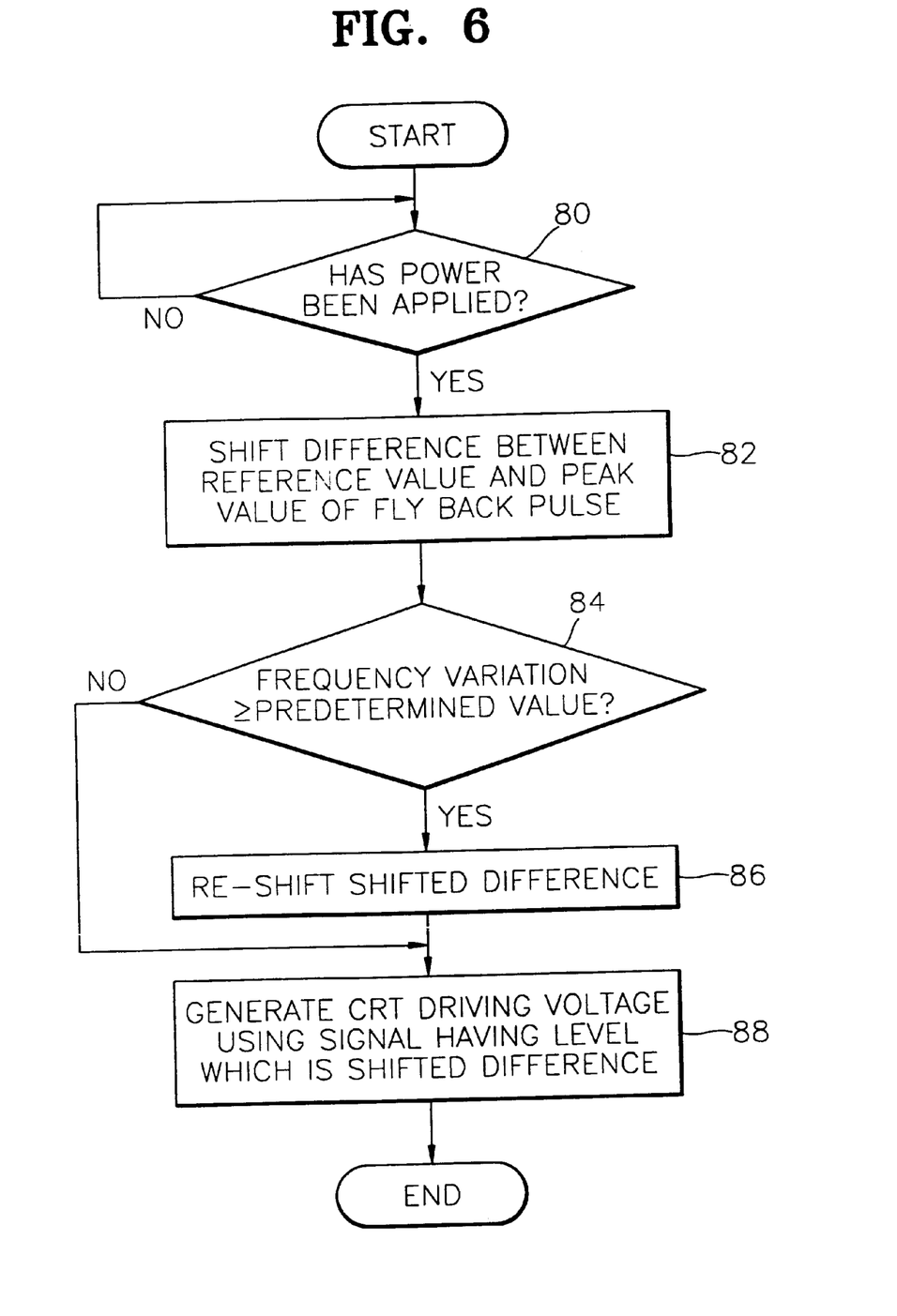
FIG. 6 is a flowchart illustrating one embodiment of a method of generating a CRT driving voltage using the apparatus shown in FIG. 1, in accordance with the present invention.

The flowchart of FIG. 6 includes steps 80 and 82, in which a primary soft start function is performed when power is applied, and steps 84, 86, and 88, in which a secondary start function is performed according to the variation of the frequency of the horizontal synchronous signal.

Referring to FIG. 6, a determination is continuously made as to whether system power has been applied from an external source, in step 80. If the power has been applied from an external source, the difference between a reference value Vref and the peak value Vfbk of a fly back pulse FBP is shifted, in step 82. As described above, the difference between the reference value Vref and the peak value Vfbk is obtained by the first comparator 10, and the difference obtained by the first comparator 10 is shifted by the stability controller 14.

Then, the frequency sensor 16 determines whether the variation of the frequency of the horizontal ,synchronous signal Hsync is equal to or greater than a predetermined value, in step 84. If the variation of the sensed frequency of the horizontal synchronous signal Hsync is equal to or greater than the predetermined value, the value shifted in the step 82 is shifted again, in step 86. That is, when the variation of the frequency of the horizontal synchronous signal Hsync is equal to or greater than the predetermined value, a logic high level control signal CS, indicating that the phase-locked loop is not locked to the horizontal synchronous signal Hsync, is generated and output to the stability controller 14, and the level of the compared signal EV' is thus re-shifted.

After step 86 or when the frequency variation is smaller than the predetermined value, the driving voltage generator 28 generates a CRT driving voltage Vout using a signal having a level which is the difference shifted by the stability controller 14, in step 88. That is, the shifted result of the stability controller 14 is compared with a sensing voltage by the second comparator 20, the result of the comparison is used to set the flip flop 24, and the transistor MN1 is turned on/turned off in response to whether the flip flop 24 has been reset, whereby a CRT driving voltage Vout is generated.

Consequently, in the aforementioned CRT driving voltage generating apparatus and the method thereof according to the present invention, the apparatus operates differently in each of two situations, that is, when system power has been applied in an early stage and when the frequency of the horizontal synchronous signal Hsync has been changed to be equal to or greater than a predetermined value.

In the first situation, the peak value Vfbk of the fly back pulse FBP is much smaller than a reference value Vref, so that the output voltage EV of the comparator 12 is very high. In this case, if the stability controller 14 shown in FIG. 1 does not exist, a very large amount of time is required to reset the flip flop 24, so that the CRT driving voltage Vout is shown higher than it is needed. Therefore, the circuits in a CRT may be broken down or operate abnormally, as described above. To prevent these problems, the stability controller 14 shifts the level of a very high output voltage EV to be lower than the sensing voltage $V\_I_{SENSE}$, using the division resistor RDIV1 or RDIV2, in the initial state when system power is applied. That is, the primary soft start function is performed in the initial state.

In the second situation, a CRT driving voltage Vout is generated although the frequency of the horizobtal synchronous signal Hsync is low, so that the circuits in a CRT may be broken down or operate abnormally as described above. To prevent these problems, the stability controller 14 discharges the charge in the capacitor C3 or C4 via the NMOS transistor MN2 or MN3, which is turned on in response to the logic high level control signal CS. Thus, it can be seen that the level of the CRT driving voltage Vout decreases at a rising edge of the control signal CS as shown in FIG. 3. At this time, the T/toff of the pulse width modulated signal PWM gradually increases, so that the CRT driving voltage Vout slowly increases to a desired level 64 as shown in FIG. 3.

As described above, in the CRT driving voltage generating apparatus and method according to the present invention, the stability controller 14 for performing a soft start function can be realized with only MOS transistors rather than with bipolar transistors, resulting in a reduction in the manufacture costs. Also, when the frequency of the horizontal synchronous signal Hsync has been sharply changed, breakdown or abnormal operation of a horizontal deflection system can be prevented by lowering the level of the CRT driving voltage Vout. Furthermore, the soft start time when power has been applied can be shorter than the soft start time when the frequency of the horizontal synchronous signal Hsync has been changed.

While this invention has been particularly shown and described with references to preferred embodiments thereof, it will be understood by those skilled in the art that various changes in form and details may be made therein without departing from the spirit and scope of the invention as defined by the following claims.

What is claimed is:

1. An apparatus for generating a cathode ray tube (CRT) driving voltage for driving a deflection yoke for generating a horizontal deflection current in a CRT, the apparatus comprising:

a first comparator for comparing a reference value with the peak value of a fly back pulse;

a stability controller for shifting the level of the result of the comparison using a current mirroring technique and outputting a compared signal having a shifted level;

a second comparator for comparing the compared signal with a sensing signal to obtain a reset signal;

a pulse width modulated signal generator for outputting a pulse width modulated signal having a level which is determined in response to the logic level of the reset signal and the logic level of a clock signal locked to a horizontal synchronous signal;

a driving voltage generator for generating the CRT driving voltage in response to the pulse width modulated signal;

a voltage sensor for sensing the level of the CRT driving voltage to generate the sensing signal; and a horizontal output unit for generating the fly back pulse having an amplitude which is determined in response to the frequency of a horizontal output signal when the horizontal output signal is locked to the horizontal synchronous signal and the level of the CRT driving voltage.

2. The apparatus of claim 1, further comprising a frequency sensor for sensing the variation of the frequency of the horizontal synchronous signal and outputting a control signal in response to the sensed variation, wherein the stability controller shifts the level of the result of the comparison in the first comparator in response to the control signal and outputs the compared signal having a shifted level.

3. The apparatus of claim 2, wherein the frequency sensor includes a phase-locked loop for locking a self-oscillated frequency to the frequency of the horizontal synchronous signal and generating the control signal indicating whether the self-oscillated frequency has been locked to the frequency of the horizontal synchronous signal.

4. The apparatus of claim 2, wherein the stability controller comprises:

a resistor, one end of which is connected to an output of the first comparator;

a first PMOS transistor having a source connected to the other end of the resistor and a drain connected to a reference voltage;

a first capacitor connected between the gate of the first PMOS transistor and the reference voltage; and a first MOS current mirror connected between a supply voltage and the reference voltage, for mirroring a reference current to the gate of the first PMOS transistor.

5. The apparatus of claim 4, wherein the stability controller further comprises:

a second PMOS transistor having a source which is connected to the other end of the resistor and a drain which is connected to the reference voltage;

a second capacitor connected between the gate of the second PMOS transistor and the reference voltage; and a second MOS current mirror connected between the supply voltage and the reference voltage for mirroring the reference current to the gate of the second PMOS transistor, wherein the capacitance of the second capacitor is greater than the capacitance of the first capacitor.

6. The apparatus of claim 4 or 5, wherein the stability controller further comprises an NMOS transistor having a gate which is connected to the control signal, a drain which is connected to the gate of the first PMOS transistor, and a source which is connected to the reference voltage.

7. The apparatus of claim 2, wherein the first and second comparators, the stability controller, the pulse width modulated signal generator, and the voltage sensor are integrated into a single chip.

8. The apparatus of claim 7, wherein the single chip further comprises the frequency sensor.

9. A CRT driving voltage generating method performed by an apparatus for generating a CRT driving voltage for driving a deflection yoke for generating a horizontal deflection current in a CRT, the method comprising:

(a) continuously determining whether power has been applied to the apparatus for generating a CRT driving voltage;

(b) shifting the difference between a reference value and the peak value of a fly back pulse using a current mirroring technique, if the power has been applied; and (c) generating a CRT driving voltage using a signal having a level which is a shifted difference, wherein the amplitude of the fly back pulse is determined in response to the frequency of a horizontal output signal when the horizontal output signal is locked to a horizontal synchronous signal, and the level of the CRT driving voltage.

10. The method of claim 9, further comprising:

(d) determining whether the variation of the frequency of the horizontal synchronous signal is equal to or greater than a predetermined value, after step (b), and returning to step (c) if the variation of the frequency of the horizontal synchronous signal is smaller than the predetermined value; and (e) re-shifting the shifted difference if the variation is greater than or equal to the predetermined value, wherein in step (c), the CRT driving voltage is generated using a signal having a level which is the difference re-shifted in step (e).

* * * * *